(12) United States Patent
Straubel et al.

(10) Patent No.: US 9,065,103 B2
(45) Date of Patent: Jun. 23, 2015

(54) BATTERY MOUNTING AND COOLING SYSTEM

(71) Applicant: Tesla Motors, Inc., Palo Alto, CA (US)

(72) Inventors: Jeffrey B. Straubel, Woodside, CA (US); Eugene Berdichevsky, Palo Alto, CA (US); David Lyons, Palo Alto, CA (US); Thomas Colson, Sunnyvale, CA (US); Martin Eberhard, Woodside, CA (US); Ian Wright, Woodside, CA (US); Robert Ferber, Woodside, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 14/192,441

(22) Filed: Feb. 27, 2014

(65) Prior Publication Data

US 2014/0178722 A1    Jun. 26, 2014

Related U.S. Application Data

(63) Continuation of application No. 12/804,799, filed on Jul. 28, 2010, now abandoned, and a continuation of application No. 11/129,118, filed on May 12, 2005, now abandoned.

(51) Int. Cl.
*H01M 2/10* (2006.01)
*H01M 2/20* (2006.01)
(Continued)

(52) U.S. Cl.
CPC .............. *H01M 2/10* (2013.01); *H01M 10/653* (2015.04); *H01M 10/613* (2015.04); *H01M 2/206* (2013.01); *H01M 10/625* (2015.04); *H01M 2/1083* (2013.01); *H01M 10/643* (2015.04); *H01M 2/1077* (2013.01);
(Continued)

(58) Field of Classification Search
CPC ............ H01M 2/1038; H01M 2/1044; H01M 2/1077; H01M 2/1088; H01M 6/5038; H01M 10/5002–10/5008; H01M 10/503; H01M 10/504; H01M 10/5048; H01M 10/5057; H01M 10/5059
USPC .................................................. 165/175–176
See application file for complete search history.

(56) References Cited

U.S. PATENT DOCUMENTS

| 2,740,824 A | 4/1956 | Stanimirovitch |
| 3,822,150 A | 7/1974 | Beardshear et al. |

(Continued)

FOREIGN PATENT DOCUMENTS

| EP | 0454017 | 10/1991 |
| EP | 0727833 A1 | 8/1996 |

(Continued)

OTHER PUBLICATIONS

"Loctite Consumer Retail Product | Product Detail." Henkel Consumer Adhesives, Inc. Apr. 22, 2004. http://www.loctiteproducts.com/products/detail.asp?catid=10&subid=48&plid=153. Internet Archive. https://web.archive.org/web/20040422043310/http://www.loctiteproducts.com/products/detail.asp?catid=10&subid=48&plid=153. Retrieved Dec. 4, 2014.*

*Primary Examiner* — Barbara Gilliam
*Assistant Examiner* — Robert S Carrico
(74) *Attorney, Agent, or Firm* — J. Richard Soderberg

(57) ABSTRACT

A battery system is provided in which the batteries are mounted between a pair of substrates, the system further including at least one cooling tube mounted next to the batteries, the cooling tube used to withdraw heat from the batteries via a circulating liquid coolant.

23 Claims, 10 Drawing Sheets

(51) Int. Cl.
*H01M 6/42* (2006.01)
*H01M 10/613* (2014.01)
*H01M 10/643* (2014.01)
*H01M 10/653* (2014.01)
*H01M 10/6557* (2014.01)
*H01M 10/6565* (2014.01)
*H01M 10/6567* (2014.01)
*H01M 2/24* (2006.01)
*H01M 10/6556* (2014.01)
*H01M 10/6563* (2014.01)
*H01M 10/617* (2014.01)
*H01M 10/625* (2014.01)
*H01M 10/663* (2014.01)
*H01M 10/6554* (2014.01)

(52) U.S. Cl.
CPC ....... *H01M 10/663* (2015.04); *H01M 10/6567* (2015.04); *H01M 10/617* (2015.04); *H01M 10/6565* (2015.04); *H01M 10/6557* (2015.04); *H01M 2/105* (2013.01); *H01M 2/204* (2013.01); *H01M 2/24* (2013.01); *H01M 6/42* (2013.01); *H01M 10/5004* (2013.01); *H01M 10/5008* (2013.01); *H01M 10/5016* (2013.01); *H01M 10/503* (2013.01); *H01M 10/5053* (2013.01); *H01M 10/5057* (2013.01); *H01M 10/5067* (2013.01); *H01M 10/5071* (2013.01); *H01M 10/5075* (2013.01); *H01M 10/5095* (2013.01); *H01M 10/6563* (2015.04); *H01M 10/6556* (2015.04); *H01M 10/6554* (2015.04)

(56) References Cited

U.S. PATENT DOCUMENTS

| | | | |
|---|---|---|---|
| 4,346,151 A | 8/1982 | Uba et al. | |
| 4,574,112 A | 3/1986 | Breault et al. | |
| 4,678,632 A | 7/1987 | Ferrari | |
| 4,945,010 A | 7/1990 | Kaufman et al. | |
| 5,034,290 A | 7/1991 | Sands | |
| 5,129,144 A * | 7/1992 | Halstead et al. | 29/890.035 |
| 5,476,141 A * | 12/1995 | Tanaka | 165/183 |
| 5,477,936 A | 12/1995 | Sugioka et al. | |
| 5,490,572 A * | 2/1996 | Tajiri et al. | 180/65.1 |
| 5,756,227 A | 5/1998 | Suzuki et al. | |
| 5,868,772 A * | 2/1999 | LeVaughn et al. | 606/181 |
| 6,399,238 B1 * | 6/2002 | Oweis et al. | 429/99 |
| 6,465,123 B1 | 10/2002 | Baumann et al. | |
| 6,468,689 B1 | 10/2002 | Hallaj et al. | |
| 6,512,347 B1 | 1/2003 | Hellmann et al. | |
| 6,689,510 B1 * | 2/2004 | Gow et al. | 429/149 |
| 7,208,816 B2 | 4/2007 | Kawakami et al. | |
| 7,291,420 B2 | 11/2007 | Bitsche et al. | |
| 2001/0007727 A1 * | 7/2001 | Bolstad et al. | 429/100 |
| 2002/0034682 A1 | 3/2002 | Moores et al. | |
| 2002/0086578 A1 | 7/2002 | Ikeda | |
| 2002/0177035 A1 | 11/2002 | Oweis et al. | |
| 2003/0031921 A1 | 2/2003 | Nakanishi et al. | |
| 2003/0054230 A1 | 3/2003 | El-Hallaj et al. | |
| 2004/0058233 A1 | 3/2004 | Hamada et al. | |
| 2004/0069620 A1 * | 4/2004 | Bitsche et al. | 204/228.6 |
| 2005/0031936 A1 | 2/2005 | Joos | |
| 2005/0048353 A1 | 3/2005 | Lisi et al. | |
| 2007/0037023 A1 | 2/2007 | Dunn et al. | |

FOREIGN PATENT DOCUMENTS

| | | |
|---|---|---|
| EP | 0905803 A1 | 3/1999 |
| EP | 1237209 | 9/2002 |
| EP | 1835251 | 9/2007 |
| GB | 2191034 | 12/1987 |
| JP | 10-106521 | 4/1998 |
| WO | WO 2006/124663 | 11/2006 |

* cited by examiner

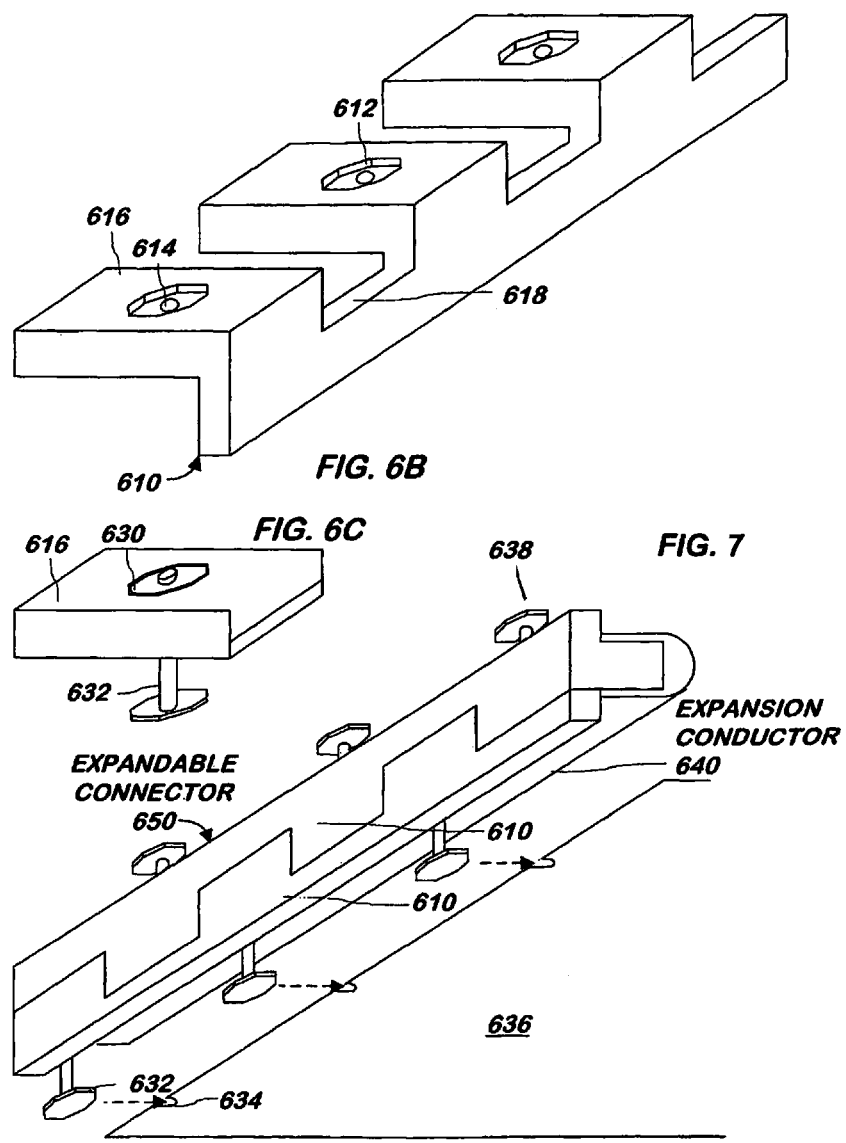

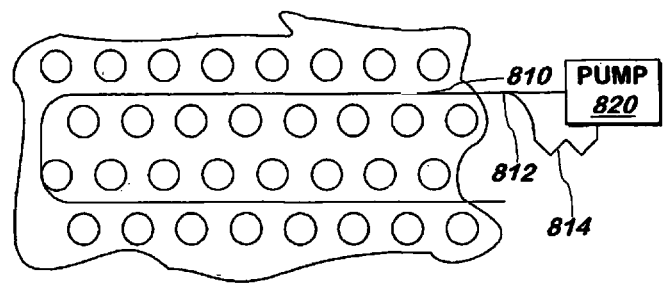
FIG. 8A
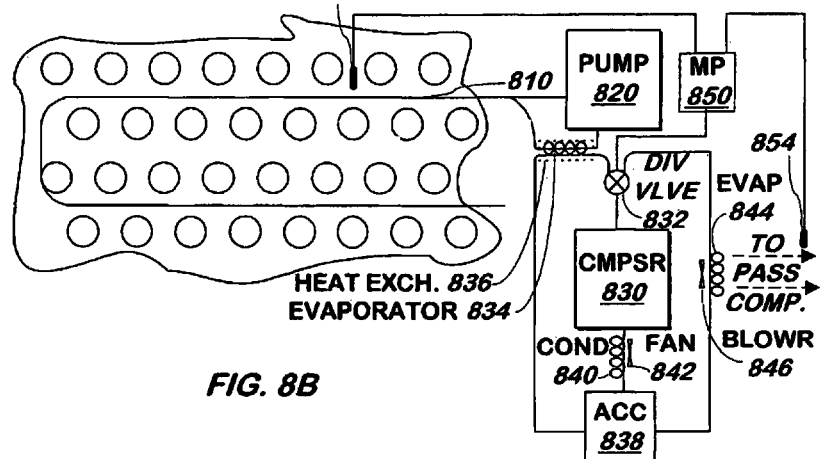
FIG. 8B
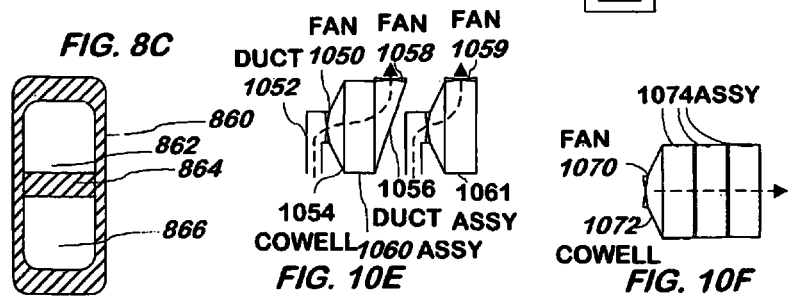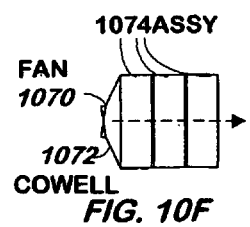
FIG. 8C      FIG. 10E      FIG. 10F

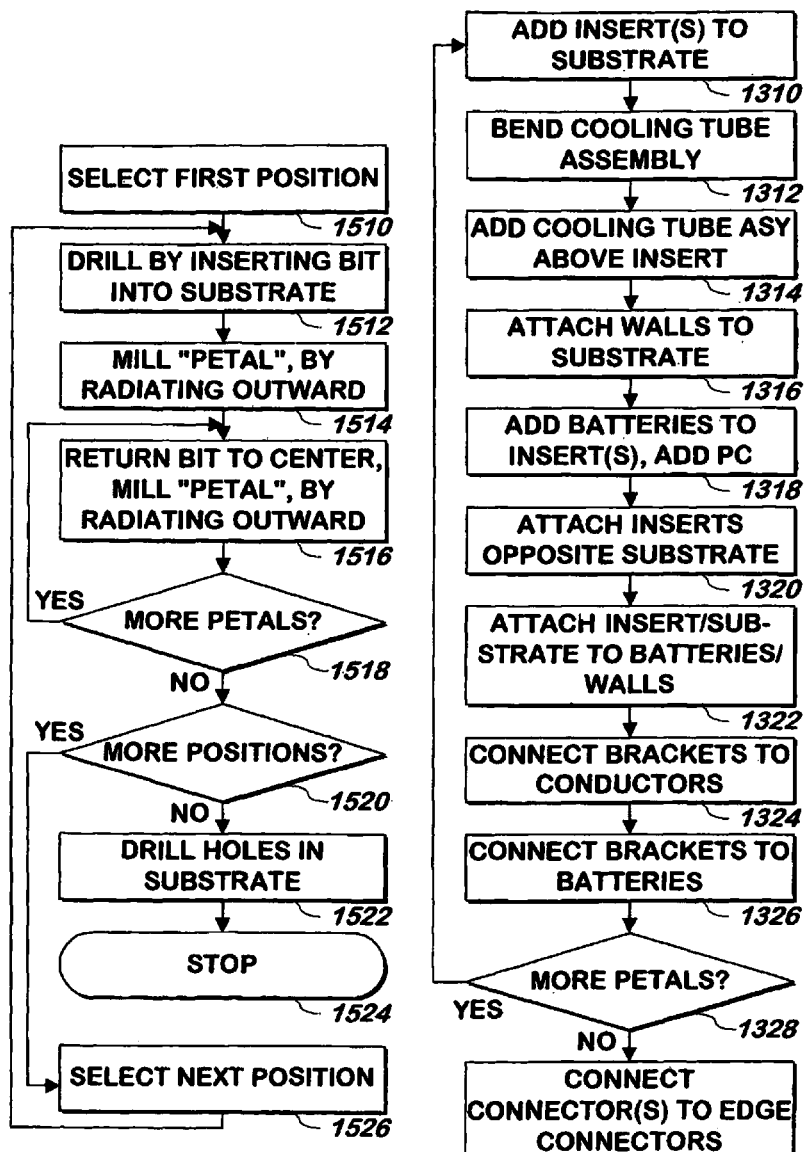

BATTERY MOUNTING AND COOLING SYSTEM

CROSS-REFERENCE TO RELATED APPLICATIONS

This application is a continuation of U.S. patent application Ser. No. 12/804,799, filed Jul. 28, 2010, and claims the benefit of the filing date of U.S. patent application Ser. No. 11/129,118, filed May 12, 2005, the disclosures of which are incorporated herein by reference for any and all purposes.

FIELD OF THE INVENTION

The present invention is related to battery systems and more specifically to systems containing multiple batteries.

BACKGROUND OF THE INVENTION

Portable electric devices can make use of batteries as a source of power. For example, conventional lithium-ion batteries may be used to power portable or mobile devices.

Conventional batteries generate significant heat from their cores. Exposing a battery to heat can significantly shorten its life, and thus, it is desirable to dissipate the heat from a battery.

To obtain higher current, voltage, or both, from a battery, the battery can be made larger. However, as batteries become larger in size, the ratio of surface area to volume decreases, causing the battery to retain more heat, decreasing its life. As a result, a standard size battery has been developed, referred to as "18650", having dimensions of 18 millimeters by 65 millimeters. Because standard sized batteries can be less expensive to produce than custom-sized batteries, many portable electric devices employ multiple 18650 batteries, and connect them in series, parallel or both, to obtain the desired current and/or voltage. Another advantage of this form factor is that it is produced in large quantities, allowing the costs of such batteries to be lower than other batteries on a cost per milliwatt-hour basis.

Banks of batteries may be connected in parallel to provide higher currents, in series to provide higher voltages, or both. Conventional banks of batteries connect in parallel multiple batteries in each bank, and then connect the banks in series or parallel to achieve the current and voltage desired. However, other configurations may foe used to obtain any desired current and voltage.

Some conventional banks of batteries are mounted into a plastic housing. If there are numerous batteries to be mounted, larger banks of batteries may be assembled. Assembling banks of batteries in a plastic housing can be cumbersome and bulky, so one manufacturer has built banks of conventional batteries in an alternative fashion by gluing batteries together in a side-by-side stack, like stacked firewood, and then connecting the terminals in each battery in the stack using a flexible nickel reed. The positive terminals on one end of the batteries are welded to the reed, and the case, which forms the negative connection, is welded to another reed at the opposite end of the row. All of the reeds at one of each of the ends of the stack are electrically connected and an external means of connection is provided at either end of the stack. The stacks are then used as building blocks to build the desired voltage and current.

However, there are significant problems with this technique. One such problem is that each of the stacks is not physically stable, because the form factor of each battery is not perfectly cylindrical. Instead, each battery is slightly conical, and so the ends of each of the batteries in a stack can shift slightly, causing the joints between the batteries to fail. This makes the glued stacks approach particularly unsuitable for environments in which significant vibration can occur, such as automotive applications. The narrower ends of the batteries can foe wrapped with tape to even out the diameter of each end of the batteries, but such wrapping is labor intensive, prone to error and subject to failure.

Another problem with stacks of glued batteries is mechanical strength. A stack is only as mechanically strong as the weakest battery in the stack. If the end of a single battery is crushed, the chemicals in the battery can be compressed, causing a short circuit or other reaction that can heat the battery to an extent that a thermal runaway occurs, in which the heat from the initial reaction causes a thermal reaction to become self sustaining and propagate until the battery fails. The heat from the battery can cause the adjacent batteries to incur the same thermal reaction until many or all of the batteries in the stack have failed. The heat from multiple such reactions can ignite adjacent materials. Turning the batteries on their sides like stacks of firewood can make the problem worse in certain environments, such as when the stack has a large number of batteries in a vibration-prone environment. The force from the vibrations can cause upper batteries to crush the lower batteries in the stack, causing the lower batteries to fail.

Additionally, conventional banks of batteries suffer frosts the problem that the conductors running across, and connected to, the positive "button" on top of the batteries can be pressed into the case of the battery during a significant impact, causing a short circuit between the positive button terminal and the electrically negative case. This makes banks of batteries particularly unsuitable for applications such as an electric or hybrid automobile, or other applications in which the batteries are likely to be vibrated or crushed. The case of the battery is insulated by a thin plastic or other material, such as Mylar. However, during an impact, the conductors that draw the positive current from the battery button terminal can burst through this insulating material to the metallic battery case, which is electrically connected to the negative terminal, thereby shorting the battery. Such an occurance could also happen simply due to vibrations occurring over an extended period of time.

Still another problem with batteries that are arranged with their edges contacting is that the heat from the batteries can cause the batteries in the center of the stack to become hotter than the batteries at the edges. As noted above, hotter batteries fail sooner than batteries that remain cool.

When multiple banks of batteries are interconnected, the connections between each bank must be manually made, increasing the costs of manufacturing. Wiring for voltage and temperature sensors at various points in the stack to allow for optimum performance further increase the costs of manufacturing.

Furthermore, the space in which the banks of batteries will be placed may not fit the banks exactly, requiring extra space to be allocated for the batteries, wasting space, and such space may be valuable in certain applications. The banks can each be made relatively smaller to reduce any wasted space, but this approach increases the need for interconnection, adding additional cost and potential points of failure.

What is needed is a system and method for providing multiple batteries in a manner that is physically strong and stable, can resist accidental crushing of one or more batteries, when handled or in an environment of vibration, that can resist crushing a conductor attached to the positive terminal into the negative body of the battery, that operates cooler and at a more even temperature than a glued stack or one in which the edges are otherwise touching, that does not require manual connection of each stack, and that can be shaped to more closely fit the available space.

SUMMARY OF INVENTION

A system and method sandwiches batteries between a rigid substrate that can distribute force across multiple batteries or other structures such as walls placed among the batteries, making them less likely to be crushed when resisting a force applied to the substrate. The substrate can be shaped to approximately fit the cross section of the available space, maximizing the use of the available space. Multiple conductors connected to the batteries via holes in the substrate draw power as well as connect the batteries in parallel, series, or both, to provide the proper current and voltage. However, the holes in the substrate are designed to lessen the likelihood that the conductor connected to the positive terminal will be shorted to the negative body of the battery in the event a force is applied that brings the batteries closer to any of the conductors. Cooling may be accomplished via air cooling or water cooling. Air may be blown among the batteries via holes in the substrates and conductors, and optionally an insert with mounts for the batteries containing integrated air holes to save space. Alternatively, or in addition to the air cooling system, cooling tubes may be run among the batteries to allow heat to be drawn away from the batteries. The cooling tubes are run adjacent to the batteries, in a structure that contains a pair of adjacent cooling tubes. Each adjacent tube has an opposite direction of flow from the other tube, and a connector connects the tubes at one end, allowing the coolant to flow past the batteries in one direction, then loop back in the other direction, to allow the coolant to not only absorb heat from the batteries, but to also maintain a more constant temperature of the batteries than would be possible if coolant having a single direction of flow was run past the batteries. The tubes may be physically connected to each other to allow heat from the tubes to be exchanged, helping to maintain a more even temperature of coolant through the tubes. The more constant temperature is maintained because the coolant along each section of the adjacent pair of tubes not only exchanges heat with the coolant in the adjacent tube, the coolest sections at the inlet are adjacent to the hottest sections at the outlet.

BRIEF DESCRIPTION OF THE DRAWINGS

FIG. 6B is a diagram of a single connector expansion piece according to one embodiment of the present invention.

FIG. 6C is a diagram of a ledge of the connector expansion piece of FIG. 6B showing a nut inserted therein, and a bolt screwed into the nut according to one embodiment of the present invention.

FIG. 7 is a diagram of an expandable connector, including two of the expansion pieces of FIG. 6B according to one embodiment of the present invention.

FIG. 8A is a block diagram of an overhead view of one or more sets of batteries showing the direction of an upper and lower cooling tube coupled to a radiator according to one embodiment of the present invention.

FIG. 8B is a block diagram of an overhead view of one or more sets of batteries showing the direction of an upper and lower cooling tube cooled via a heat exchanger coupled to an air conditioner according to one embodiment of the present invention.

FIG. 8C is a cross sectional view of a structure that contains a pair of tubes according to one embodiment of the present invention.

FIG. 10E is a diagram of two air cooled battery assemblies according to one embodiment of the present invention.

FIG. 10F is a diagram of three air cooled battery assemblies according to one embodiment of the present invention.

FIG. 13 is a flowchart illustrating a method of assembling substrates, inserts, cooling tubes, walls, batteries, and conductors according to one embodiment of the present invention.

FIG. 15 is a flowchart illustrating a method of mounting batteries according to one embodiment of the present invention.

DETAILED DESCRIPTION OF A PREFERRED EMBODIMENT

Figure 1:
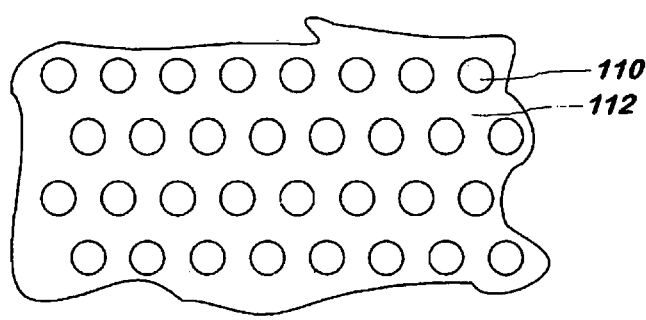
FIG. 1 is a block diagram of a bank of batteries according to one embodiment of the present invention.

Referring now to FIG. 1, a substrate used to hold one or more sets of one or more batteries is shown according to one embodiment of the present invention. The batteries used in one embodiment are any conventional rechargeable batteries having an 18650 form factor, but other types of batteries and other form factors may be used.

The substrate 112 may be made of a material that electrically insulates one face of the substrate from the other face. The substrate 112 has at least two faces and may or may not be substantially flat. In one embodiment, the substrate 112 has two primary faces, both of which are made of an electrically insulating material. In one embodiment, the substrate is a single layer of such insulating material, such as fiberglass or plastic, and in another embodiment, one or more layers of a conducting material are formed in the substrate in the manner of a conventional printed circuit board to allow wiring for sensors to be run along as part of the substrate.

The substrate 112 may be cut or formed into a shape that matches or somewhat matches two of the dimensions of a space available for batteries. As shown in the figure, the substrate 112 has an irregular shape, but regular shapes (e.g. a triangle or square) may also be used. This can allow a higher number of batteries to occupy the space available for such batteries than would be possible if the substrate 112 shape did not match the space available. Although the shape of the substrate 112 can help to maximize the number of batteries that can fit into a space, as noted below, in one embodiment, the batteries are not so tightly packed as to have the sides of each battery touching one another, but instead are spaced from one another to allow for cooling and to allow for dimensional tolerance of the batteries. In one embodiment, the batteries are spaced to allow for cooling of the batteries, either by air cooling or cooling via tubes running between the batteries as described in more detail below.

In one embodiment, the substrate 112 has a substantially flat shape. In one embodiment, the substrate 112 is a 3/8 inch thick fiberglass sheet, however, as described below, injection-molded plastic may be used, as well as other substrates. Any electrically-insulating material may be used for a substrate 112.

In one embodiment, the substrate is substantially rigid, to allow it to distribute force applied to one portion of the substrate among a wider area. As noted below, batteries are sandwiched between two substrates, and if the substrate is rigid, a force applied perpendicularly to the surface of the substrate 112 external to that of the batteries, will be distributed by the substrate 112 across two or three or four or five or more of the batteries and potentially many more. As noted below, the force may also be applied to spacers, walls or other structured components of the finished assembly. Thus, each of the batteries will be required to withstand only a fraction of the force, making it less likely that the force will crush any battery. In one embodiment, dozens of batteries and spacers and/or walls are sandwiched between a substrate that is sufficiently thick to distribute a force across many of the batteries, making it extremely resistant to crushing. As described below, spacers, walls, or both may be sandwiched between the substrate in addition to the batteries, either near the sides of the substrate or interior thereto or both, and if the spacers or walls have a crushing strength greater than the batteries, the spacers and/or walls add additional crush strength to the sandwich of batteries and substrate.

In one embodiment, each substrate 112 has a mount 110 for the insertion of each battery held by the substrate. In one embodiment, there are multiple mounts on the substrate, allowing a substrate to hold multiple batteries. The mount 110 may foe raised from the substrate 112 or recessed into it or both. Batteries are inserted into mounts 110, which are milled, molded or otherwise formed in the substrate 112 or, as noted below, the mounts may be milled, molded or otherwise formed into an insert to the substrate 112.

In one embodiment, mount 110 is a well, and such embodiment will now be described, although the description of how the well is used is applicable to any form of mount 110. In one embodiment, the well extents from one surface of the substrate, part way into the substrate 112. For example, for a 3/8 inch substrate, the well may be 1/4 inch deep. The well may be shaped so that it holds the end of the battery when a battery is pressed into it. In one embodiment, a well is formed as will now be described with reference to FIG. 2A, which shows the various positions of a milling tool used to mill each well in the substrate.

Figure 2A:
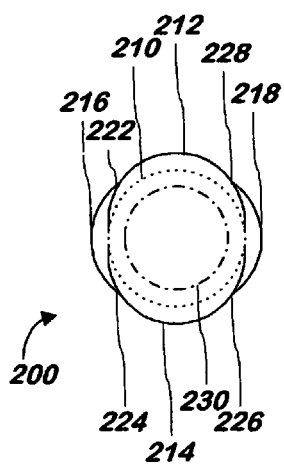
FIG. 2A is a diagram showing a creation of a mount and a hole in the substrate used to hold the batteries in the bank according to one embodiment of the present invention.

Each well 200 will hold one of the two ends of each battery to be mounted in the substrate. Referring now to FIG. 2A, a well 200 is shown according to one embodiment of the present invention. In one embodiment, a well 200 is milled using an 11/16 inch mill bit. The end of the bit is brought into contact with the surface of the substrate 112 to drill a pilot hole 210 part way through the substrate, for example 1/4 inch deep in a substrate that is thicker than 1/4 of an inch. The bit is then moved sideways 12/1000 of an inch from the pilot hole in three or more directions, so as to form "petals" extending from the pilot hole 210. As shown in the figure, four directions are used to make four petals, with the bit being brought to position 212, then to position 214, then back to the position of the pilot hole 210, and, from the position of the pilot hole, to position 216 and then to position 218. The bit is moved 12/1000 of an inch from the pilot hole center for each of the four directions. The resulting hole is slightly smaller than the battery at several points 222, 224, 226, 228, such points being referred to as "teeth". Teeth 222, 224, 226, 228 are thin (e.g. they have about the same or a smaller cross section than the thickness of the substrate that comes in contact with the battery when mounted) or narrow areas of substrate 112 that contact the battery inserted in the mount and hold it at modest to high force per square inch as compared with the other edges of the well 200, which may not contact the battery at all. The force may be at least large enough so that a battery will not wobble or fall over when inserted into the mount. The teeth 222, 224, 226, 228 may slightly deform when a battery is inserted into the well, allowing the teeth 222, 224, 226, 228 to hold the battery in place when the battery is inserted.

A hole 230 is then drilled from either direction all the way through the substrate 112. In one embodiment, hole 230 is centered at the pilot hole of the well 200, and has a diameter approximately equal to, or slightly smaller than, the diameter of the positive button terminal of the battery. In this arrangement, substrate 212 will protect the negative body of the battery front being shorted to the positive terminal in the event that a conductor in contact with the positive terminal of the battery near the face of the substrate 112 outside of the face holding the battery is pushed towards the batteries. The hole 230 will allow electrical connection to the terminals of the battery as described in more detail below. Hole 230 is not considered part of the well 200 or other mount in one embodiment, and in another embodiment, it is.

Figure 2B:
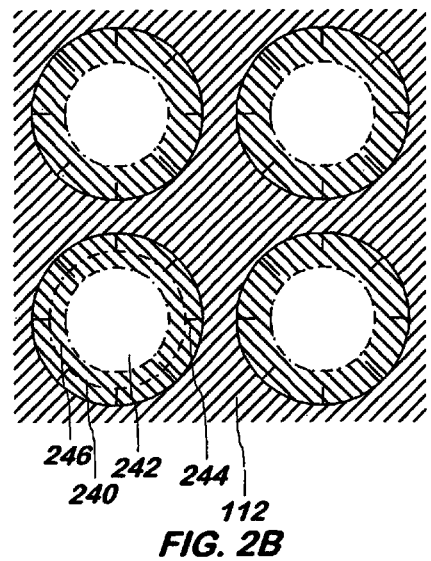
FIG. 2B is a diagram of four mounts in a substrate used to hold batteries in a bank according to one embodiment of the present invention.

There are other ways of providing a mount 110 and hole for each end of each battery held by substrate 112. Referring now to FIG. 2B an alternate manner of providing a mount 110 and a hole in substrate 112 is shown. In this embodiment, substrate 112 may foe molded from conventional plastic, such as by using conventional injection molding techniques. Substrate 112 is shown with four wells 240 used to hold the ends of each of four batteries (not shown). Although four wells 240 are shown in one embodiment, there may be any number of wells 240. The wells 240 are areas of the substrate 112 that are thinner than other areas of the substrate 112, for example, if the substrate between the wells is generally ½" thick plastic, the wells may be formed so that the thickness of the plastic is ⅛" within the well. The side of the substrate 112 opposite the well 240 may be completely flush with the remainder of the substrate. The well 240 forms a depression in the substrate 112 to admit one end of the battery. Each well may have a substantially circular shape, though other shapes may be used. Each well 240 has several fins 244 to hold the battery, the fins 244 having a relatively narrow thickness, such that they can deform when a battery is inserted into the well and operate like the teeth described above. The circular area 246 exposed by the fins 244 is slightly less than the cross section of the end of the battery being inserted, and in one embodiment, the areas 246 may be slightly smaller or larger based on the polarity of the battery end being inserted. A hole 242 is formed or drilled in the substrate 112 to allow electrical connection to the batteries, and serves the same purpose and has the same geometry relative to the well 240 as hole 230 had relative to well 200.

The holes are shown herein as being round, but holes may have any shape. Holes and the elements that hold the batteries may be any shape.

Figure 3:
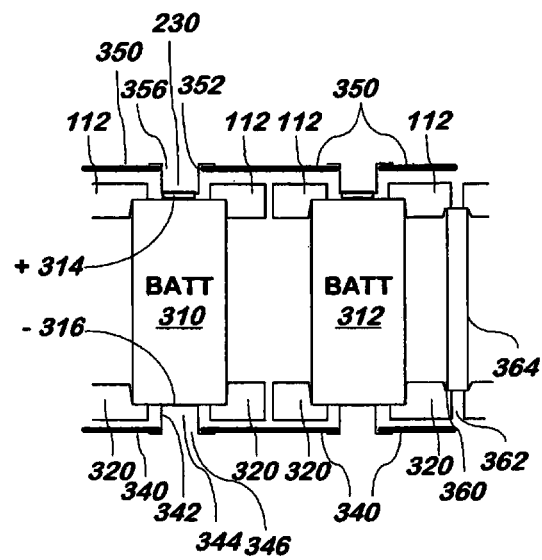
FIG. 3 is a side view of batteries in a bank including two substrates and two conductors with electrical connection brackets according to one embodiment of the present invention.

Referring now to FIG. 3, a cross section of a substrate 112 of FIG. 1, and another substrate 320 sandwiching batteries 310, 312 is shown according to one embodiment of the present invention. In one embodiment, substrate 320 is a mirror image of substrate 112 described above, and otherwise is of similar or identical manufacture as substrate 112.

Batteries 310, 312 are inserted into one substrate 320, and then a press may be used to press the opposite substrate 112 onto the other end of the batteries. As noted below, spacers such as spacer 364 may be inserted into spacer wells 360 in substrate 320 before substrate 112 is pressed onto batteries 310, 312 to allow spacer 364 to be a part of the structure containing batteries 310, 312, spacers 364 and substrates 112, 320. Spacer 364 provides added crush strength to the structure formed by the batteries 310, 312 and the substrates 112, 320, and the screws or other fasteners (not shown) that may connect the substrates 112, 320 to the spacer 364 via hole 362 (and the opposite hole in substrate 112) provide a clamping force to hold the substrates 112, 320 more securely against the batteries 310, 312.

Although only two batteries are shown in the Figure, any number of batteries may be employed in a similar fashion. Although only one spacer 364 is shown, any number may foe used at the periphery of the substrates 112, 320, interior thereto, or any of these locations.

Hole 230 and similar hole 344 in the substrates 112, 320 permit electrical connection to battery 310, and other similar holes on either end of other batteries, permit electrical connection between the terminals 314, 316 of the batteries 310, 312 and two different conductors 340, 350. In one embodiment, conductors 340, 350 are made of a conducting material such as copper or copper plated metal and have the shape of plates. In one embodiment, the plates are rigid, having a thickness in excess of approximately 20/1000 of an inch. In each conductor 340, 350 are holes 346, 356 placed so that the holes 346, 356 will be approximately at the location of the battery terminals 314, 316 when the conductors 340, 350 are mounted to the substrates 112, 320. The conductors 340, 350 may be mounted using spacers to hold the conductors 340, 350 slightly off of the substrates 112, 320, just outside of the area in which the battery is sandwiched, or the conductors 340, 350 may be attached directly to, on the face outside of, their respective substrates 112, 320. Conductors 340, 350 may be glued to the substrates or may be held down by the welds to the batteries as described below. In one embodiment, conductors 340, 350 are a part of the substrates 112, 320 themselves, in the manner of a printed circuit board.

In one embodiment, the conductors 340, 350 have attached thereto, brackets 342, 352 made of a conducting material, such as tin, nickel or copper. In one embodiment, there is one bracket 342, 352 attached to the conductor 340, 350 per battery 310, 312 that is or will be electrically connected to the conductor 340, 350, although other embodiments employ multiple brackets as a single strip. In one embodiment, before attaching the conductors to the batteries 310, 312, the bracket 342, 352 is inserted into a hole 346, 356 in the conductor 340, 350. In one embodiment, in each conductor 340, 350, there is one hole 346, 356 and one bracket 342, 352 per battery that a conductor 340, 350 will contact. When all of the brackets 342 of a conductor 340 have been inserted into the holes of that conductor 340, the brackets are then wave soldered, welded, infrared reflow soldered or otherwise electrically connected to the conductor 340, thereby forming an electrical connection between the brackets 340 and the conductor 342. Other methods of electrically connecting the brackets 342 of a conductor 340 and the conductor 340 may be employed. In one embodiment, the holes 346, 356 in the conductors 340, 350 are on the same centers as, but smaller than, the holes 230, 344 in substrates 112, 320.

Figure 4:
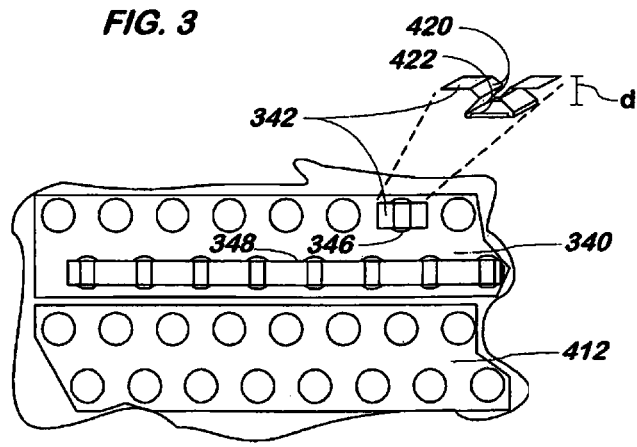
FIG. 4 is a diagram of two conductors with a representative bracket, including an alternate view of the bracket to show its geometry according to one embodiment of the present invention.

A representative bracket 342 and conductor 340 are shown from a different angle in FIG. 4. As can be seen in FIGS. 3 and 4, brackets, such as bracket 342 have a substantially U shape with the ends bent outward so that they can be inserted into the holes such as hole 346, one bracket per hole. Each bracket may be made of a shape, material or both to allow it to have at least a slight give, to allow the brackets 342 to compensate for variation in battery placement within the mounts and the substrate and optionally, the inserts used to mount the batteries as described herein. In one embodiment, each bracket, or multiple portions of a strip, has a shape substantially as shown in the expanded view of FIG. 4 that allows for a spring action to accommodate variations in lengths of the batteries and tolerances in substrates, mounts, and the like. Bends forming the surfaces 420 provide the spring action, with the distance d between the underside of the topmost horizontal surface and the underside of the bottommost horizontal surface at least as large as the maximum expected distance between the outside of the conductor 340 and the edge of the any terminal of any of the batteries. Stiffeners 422 are a bent piece of the bracket 342 that helps keep the lowermost horizontal surface substantially flat. The geometry and dimensions of the bracket 342 may be arranged to ensure that if it is crushed into the positive terminal, it does not splay into the negative case of the battery, but instead, side surfaces compress inwards.

Although only one bracket is shown in the Figure, each hole shown may have a bracket inserted in the same manner as is shown and wave soldered to each conductor 340, 412 in one embodiment. In one embodiment, a single bracket 348 in the shape of multiple end-to-end brackets 342 spans multiple holes, to reduce the manufacturing costs of installing multiple brackets.

The holes such as hole 346 are positioned to have the same spacing as the batteries 310, 312 over which they will be positioned so that when a conductor such as conductor 340 is placed into position above or below a set of batteries, that each of the brackets for that conductor will contact a terminal 314 or 316 of a different one of the batteries in the set or sets of batteries to which the conductor 340 is in physical and electrical contact.

The conductors 340, 350 may be mounted to the substrate 112 or 320 so that each of at least one of the brackets 342, 352 are in contact with at least one terminal 314 or 316 of a battery 310, 312 mounted or to be mounted in substrate 112 and 320. In one embodiment, the distance d of bracket 342 is such that it will extend through the hole 346 in the conductor 340 and the hole in the substrate 320 and any space between the conductor 340 and the substrate 320 and contact a battery 310, 312, even if the battery 310, 312 is not fully seated into its mount. Bracket 352 is similarly or identically sized for its conductor 350, substrate 112 and any spacing between the two.

In one embodiment, each bracket 342, 352 may then be physically attached, such as via a weld from a spot welder or laser, to the terminal 314, 316 to which it is connected.

Spacer well 360 admits a metal or plastic spacer 364 with optional holes drilled into both ends of (and optionally, all the way through) the spacer 364 to admit a screw (not shown) to be inserted into hole 362 from under substrate 320 and screwed into the spacer 364. Another screw may be screwed into the other end of spacer 364 from above substrate 112. Spacers may be positioned along the periphery of the substrates 320, 112 or interior thereto or both types of positions of spacers may be used.

In one embodiment, the batteries 310, 312 are arranged in sets of one or more batteries 310, 312, with all of the batteries in the same set being oriented with the same polarity in one direction, and all of the batteries in the set having their terminals 314, 316 electrically connected by, and physically in contact with, the same conductor 340, 350, although, as noted below, a conductor 340, 350 may be in electrical and physical contact with at least one other set of batteries, oriented with the opposite polarity as the first set, thus forming a series connection between the sets.

Conductors 340, 350 are used to connect the set of batteries 310, 312 in contact with the brackets in parallel with the other batteries of the set, and optionally in series with another set. This may be accomplished by inverting the batteries in an adjacent set and using a single conductor 340, 350 to connect all of the batteries at one end of each set. When this arrangement is used, the batteries in the first set are connected in parallel with each other, as well as in series with the other set. Adjacent sets of batteries may be alternately positioned, with a conductor 340, 350 spanning both sets of batteries on one side, though all the batteries in one set will contact the same conductor with a different polarity from all the batteries in the other set.

Walls may Support the Substrates

Figure 11:
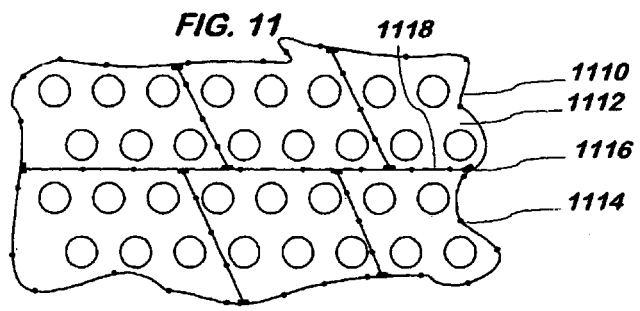
FIG. 11 is a diagram of a substrate and walls according to one embodiment of the present invention.

As noted above, batteries, spacers or both may be the primary means of connecting and supporting substrates. However, in another embodiment, perimeter and divider walls are used as one method or the primary method to connect and support the substrates. Referring now to FIG. 11, the substrate shown in FIG. 1 is shown with perimeter and divider walls according to one embodiment of the present invention. A perimeter wall 1110 is attached to substrate 1112. Attachment may be made by means of glue, heat bonding or melting of the wall 1110 to the substrate, or conventional snap together methods or other fasteners via fasteners 1114. Perimeter wall 1110 may be made of several pieces, with edge or corner connectors connecting each of the pieces. Perimeter wall 1110 may contain connectors such as connector 1116, which may be a slot or other fastener molded into the perimeter wall 1110. Connector 1116 attaches to a divider wall 1118, which may be attached to the substrate 1112 in the same manner as perimeter wall 1110. As shown in the figure, divider walls such as divider wall 1118 may itself have connectors that hold up still other divider walls.

In one embodiment, perimeter walls 1110 are used to physically protect batteries from outside intrusion, and divider walls 1118 are used to protect batteries, that may be pushed via an unwanted external force, from pushing other batteries nearby, and may also confine any unwanted thermal reactions to a subset of the batteries bounded by one set of walls 1110 or 1118. In addition, because the side walls of the batteries are connected to the negative terminal, and negative terminals of adjacent batteries may be at different potentials from one another, the use of divider walls 1118 can help prevent short circuits that would otherwise occur if the batteries, having different electrical potentials of their respective cases were to touch cases due to an unwanted force. In one embodiment, either a divider wall or a cooling tube (described below) is used to separate adjacent batteries having negative terminals and cases at differing potentials.

Electrical Connections

Figure 5:
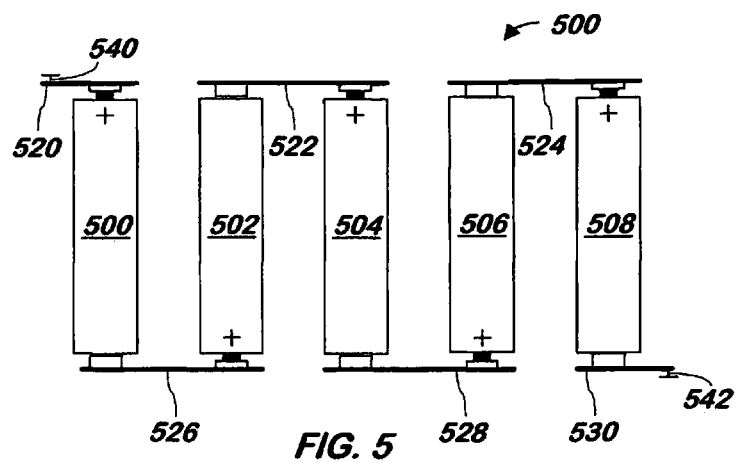
FIG. 5 is a side view of five sets of batteries coupled using conductors according to one embodiment of the present invention.

FIG. 5 shows 5 batteries 500-508 connected in series to increase the voltage to approximately five times the voltage of one battery via conductors 520-530 using the techniques of the present invention (the substrates, brackets, and spacers have been omitted from the Figure to improve the clarity of the Figure). Although there is only one battery 500-508 in each set in FIG. 5, more than one battery per set connected to the same pair of conductors 520-530 and using the same polarity as each battery 500-508 shown could have been used to increase the current to an approximate multiple of the current of the single battery 500-508. In one embodiment, end conductors 520, 530 have terminals 540, 542, which may be screw terminals or an embedded screw post with a nut that is screwed over the screw post. A wire may be attached to each terminal 540, 542 in a conventional manner to allow power from the battery to be brought to a point of use. The point of use may be an electric motor in an electric car in one embodiment of the present invention, and there may be more than one terminal 540, 542 per end conductor 520, 530, such as is described below. It is noted that in the Figure, conductors 520-530 collectively contact all of the batteries from which current through each conductor 520-530 is provided, but individually, the conductors 520-530 do not contact all of the batteries 500-508 and each conductor 520-530 is at a different electrical potential from the others relative to any other one of the conductors 520-530.

As shown in the Figure, an odd number of sets of batteries (in the Figure, there is one battery per set) will cause the end conductors 520, 530 to be located on opposite sides of the batteries 500-508. Having an odd number of sets, where the sets are connected to one another in series as shown, can produce a useful assembly 500 of batteries 500-508 because the assemblies themselves can be coupled in series with a minimum of interconnection. If the sets of batteries are arranged in a pattern that causes the first set and the last set to be near each other (such as if the sets are arranged in a somewhat circular pattern around the assembly, the end conductors can be on opposite sides of the assembly, in the same general region, but without significant cross connection structures, allowing interconnection of assemblies with a minimum of cross connection runs.

Stacks, and the Interconnection between them

Figure 6A:
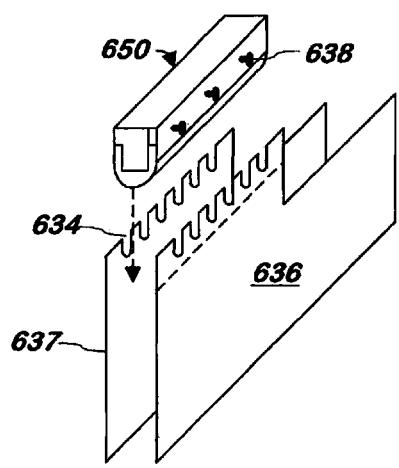
FIG. 6A is a block diagram of the end conductors from two different stacks of multiple sets of batteries and a connector between the stacks according to one embodiment of the present invention.

The batteries sandwiched by substrates and inserts and connected by conductors as described herein may have insulating paper or other insulating material attached thereto, and multiple such assemblies or structures of batteries may be electrically interconnected. FIG. 6A illustrates the end conductors 636, 637 of two different structures, similar to the end conductors 530, 520 of FIG. 5, each coupled to one or more sets of batteries arranged as described above with respect to FIGS. 1-5, with the detail showing the batteries, substrates, remaining conductors and other structures omitted in the Figure to show the interconnections between end conductors of two different structures (the word structure and assembly are used interchangeably herein). End conductor 636 is an end conductor of one structure, and end conductor 637 is an end conductor of another structure, with the structures intended to be electrically connected in series to one another using expandable connector 650.

Referring now to FIG. 6A, end conductors 636, 637 have a portion rising above the substrate sandwiched between the end conductors 636, 637 and the batteries to which the end conductors 636, 637 are coupled, such portion being illustrated above the dashed line in the Figure, said line representing the top of the substrate. In one embodiment, U-shaped holes 634 are milled into, or formed as part of, the end conductors 636, 637 to allow insertion of terminals 638 of a connector 650 to be inserted therein, when the connector 650 is inserted in the direction of the arrow. Terminals on the opposite side of expandable connector 650 are not visible, but are the same in number as the visible side, and offset from those on the visible side. In one embodiment, there are more U-shaped holes 634 than terminals 638 on one side of the expandable connector 650 to allow each end conductor 636, 637 to operate on either side of connector 650. Terminals 638, which may be bolts or screws are then tightened over the end conductors 636, 637 to cause a connection between the end conductors 636, 637 and an expandable conductor 640 made of copper or another conducting material. Expandable conductor 650 is a flat conductor bent in a U cross section, and flexible enough to expand when terminals 638 are tightened.

Expandable connector 650 is shown in greater detail in FIG. 6D. Referring now to FIG. 6D, expandable connector 640 has three primary sets components. There are two expansion pieces 610, one expandable conductor 640 and six terminals 638, though other numbers of terminals may be used.

Expansion pieces 610 are shown in greater detail in FIG. 6B. Referring now to FIG. 6B, one embodiment, expansion piece 610 has multiple ledges 616, each ledge 616 containing a recessed well 612 that holds a nut and prevents it from turning, and may be a tight enough fit to hold the nut in place in the well 612. The well 612 is about as deep as the nut is thick. Each well 612 has a hole drilled or formed into the center of the well and extending straight through to the opposite side of the ledge 616. FIG. 6B shows a ledge in greater detail. A nut 630 has been inserted into the well and a bolt 632 has been inserted from the opposite side of the ledge 616 from the side from which the nut was inserted 630 through the hole in the well and threaded into the nut 630. As noted below, in practice, the nut will be inserted through a hole in the expansion conductor 640, which is not shown in FIG. 6B.

Referring now to FIGS. 6B-6D, to assemble the expandable connector two expansion pieces 610 are mated together, facing one another so that their ledges 616 are in a single plane, but having their wells facing 180 degrees away from one another. The expansion conductor 640 is slipped over the ledges 616 and bolts or screws are inserted through holes in the expansion conductor and through a hole 614 in the ledge 616 until they reach the nuts 630 at the opposite side of the ledge 616, and are screwed part way into the nuts 630. Referring momentarily to FIG. 6A, the expansion connector 650 is slipped between two end conductors as shown in FIG. 6A, and the screws or nuts 632 are tightened.

When the screws or bolts 632 are tightened, they pull the ledges 616 of the expansion connectors 610 apart from one another in opposite directions, with the face of the ledge opposite the well 612 pressing against the nearby area of the expansion conductor 640 to press it into contact with the edge connector 636, 637, providing an electrical connection that can carry significant current and is physically stable, yet can be disassembled and reassembled as necessary.

Expandable conductor 650 is described herein as connecting two structures in series. However, expandable conductor may be used to connect multiple structures in parallel as well.

Cooling

Liquid Cooling

In one embodiment, the batteries may be liquid cooled via small, thermally conductive tubes through which water or another coolant, such as any conventional anti-freeze mixed with water, oil, or even cold air, may be circulated via conventional means such as a pump.

The tubes absorb heat from the batteries and transfer it to the liquid, coolant or air. The pump may pump the liquid to a radiator where the heat is released to the air near the radiator, or to a heat exchanger that exchanges heat with a refrigerant, such as conventional R-134a, that operates as part of a conventional heat pump, which absorbs heat from the coolant or other liquid and releases it to a radiator. In the event that the batteries are powering an electric car, the radiator may be drawn through the ambient air when the car is in motion to enable additional heat to be released into the air.

Figure 9:
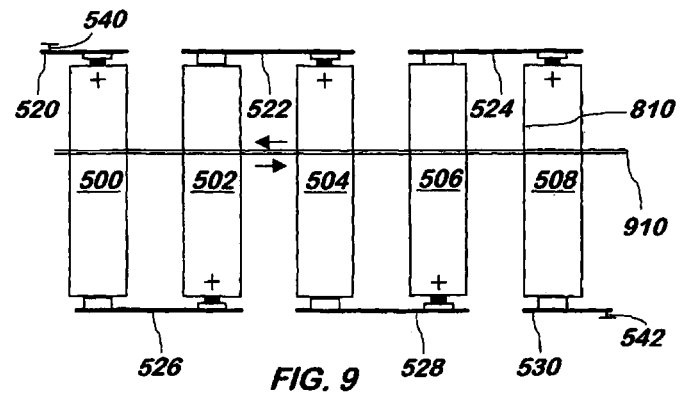
FIG. 9 is a block diagram of the side view of a row of the sets of batteries illustrating the upper and lower tubes from a different perspective than can be shown in FIG. 8A, according to one embodiment of the present invention.

FIGS. 8A and 9 illustrate the coolant-containing tube, from different perspectives: FIG. 8A is a top view and FIG. 9 is a side view of a different set containing a different number of batteries, but is similar to what would be seen by looking from the third row of batteries from the top of FIG. 8A towards the second row of batteries from the top of FIG. 8 to show the detail not visible in FIG. 8A. FIG. 9 is actually superimposed onto the batteries shown FIG. 5. In one embodiment, one tube 810 is arranged to run near each battery (the position of each battery will roughly correspond to the circles of FIG. 8A) in one or more sets. Referring now to FIGS. 8A and 9, in one embodiment, the tube has an inlet 812 for accepting the liquid, which runs near each of the batteries that it will cool, and then, in one embodiment, the tube turns around via a turnaround section 910 shown in FIG. 9 and runs past each battery a second time, either on the same side of the battery as the first run, or on the opposite side. The turnaround section 910 may be outside of the substrate, for example, near inlet 812, to avoid a joint (between turnaround section 910 and the remainder of the tube 810) being near the batteries. Conventional heat conductive, but not electrically conductive, potting compound (not shown) or another heat conductive substance, such as KONA 8701-LV-DP heat conductive compound commercially available from Resin Technology Group, LLC, may be poured over the tubes so that it also touches the batteries and helps conduct heat from the batteries to the tubes.

The direction of flow of the coolant in the tubes is shown by the arrows in FIG. 9. An outlet (directly over the inlet 812 in one embodiment) exhausts the coolant to the radiator 814 where the coolant releases its heat, with the coolant being circulated by pump 820. Because two runs of the tube are used near each battery, with the flow of coolant in the tubes running past each battery being in opposite directions and in the opposite order, the batteries may be cooled more evenly than if a single run were employed. In one embodiment, the two tubes are actually part of a single structure, to allow the heat from the two tubes to be exchanged, further stabilizing the temperature of the coolant in the tubes across the run of the tubes. Referring now to FIG. 8C, a single structure 860 containing two tubes is shown according to one embodiment of the present invention. The structure 860 contains crosspiece 864, and may be formed as part of a single extruded piece of aluminum or another heat-conductive material. The crosspiece 864 and structure 860 form the two tubes 862, 866 having opposite directions of flow. In one embodiment, the top tube 862 is coupled to the inlet and in another embodiment, the top tube 862 is coupled to the outlet, though other embodiments may reverse those connections.

In one embodiment, the outer surfaces of the tubes are made of an electrically insulating material so as not to cause shorts between the cases of the batteries, which are electrically connected to the negative battery terminal. Because the negative terminals of different batteries are at different electrical potentials, if the tube touches the batteries, a short could occur if a tube were made of an electrically conductive material. In one embodiment, the tubes are made of aluminum and the outer portion is anodized to cause the outer edges of the aluminum to be a poor conductor.

In one embodiment, instead of a radiator absorbing the heat from the tubes and their contents, in the case of an at least partially electric-powered car or other vehicle, heat from the tubes and their contents may be absorbed by an evaporator in a conventional air conditioning system. Referring now to FIG. 8B, a system for cooling batteries is shown according to one embodiment of the present invention. Elements 810-820 operate as described in FIG. 8B above, except that instead of releasing heat to a radiator 814, heat from the batteries absorbed by the coolant in the tubes is released to a conventional evaporator 834 in a heat exchanger 836. Compressor 830 compresses a refrigerant and provides it to a condenser 840, which may be placed near a fan 842 or other airflow. The refrigerant arrives into an accumulator and is provided to the evaporator 834 and returned to compressor 830. A heat exchanger 836 allows the evaporator 834 to absorb heat from the tubes, after the coolant has passed by some or all of the batteries. In one embodiment, a single compressor is used to not only cool the batteries, but also the air in the passenger compartment. A second evaporator 844 absorbs heat in air provided to the passenger compartment via a blower 846 and the refrigerant then collects in the accumulator 838. A diverter valve under control of a microprocessor 850 having sensors 852, 854 to sense the temperature of the batteries and the air in the passenger compartment determines the proper amount of refrigerant to allocate between the evaporator 834 serving the batteries and the evaporator 894 serving the passenger compartment air, based on the temperatures and the requirements of each system.

Air Cooling

The batteries in each set may be air cooled via spaces between the batteries in between which air can blow through. Air cooling may be used in addition to the liquid cooling described above, or in place of it. In one embodiment, inserts to be added to the substrates are used to mount the batteries using integrated cooling holes and mounts as are described more completely below. The substrate is made of a glass-fiber-containing material for strength and rigidity, yet the insert is made of a more flexible material for better battery holding properties. Both the substrate and the inserts contain air holes into which air may be blown, or out of which air may be removed through suction, or both. The air holes may be integrated with the mounts, so that the air can blow directly into the spaces between the batteries, and yet the mounts do not interfere with the air cooling.

Referring now to FIGS. 10A-10D, a portion of an insert 1016 including integrated mounts 1018 with integrated air cooling holes 1012 in each of the mounts 1018, is shown according to one embodiment of the present invention. In one embodiment, insert 1016 is placed between the substrate and one or more batteries, although in another embodiment, the features of insert 1016 are part of the substrate. In one embodiment, insert is made of any flexible, insulating material and may be different from, or the same material as, the substrate.

Figures 10A, 10B, 10C, 10D:
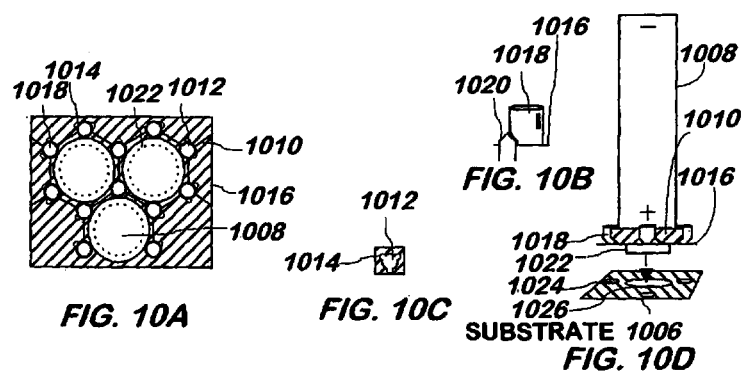
FIG. 10A is a diagram of a portion of an insert including mounts with integrated air holes according to one embodiment of the present invention.
FIG. 10B is a diagram of a mount being drilled according to one embodiment of the present invention.
FIG. 10C is a diagram/of the reverse side of a portion of an insert behind a mount according to one embodiment of the present invention.
FIG. 10D is a diagram of three mounts shown from the side, including a key under the insert according to one embodiment of the present invention.

FIG. 10A is a top view of a portion of a portion of an insert 1016 with batteries, such as battery 1008 inserted into the mounts 1018. In one embodiment, some mounts are shared between two or three batteries, such as the mount shown in the center of FIG. 10A. In one embodiment, each mount 1018 has the shape of a short hollow tube that is molded above a hole running through the insert 1016, with the hollow portion running perpendicular to the substrate 1016.

A flat cross piece 1010 may be molded between pairs of mounts 1018 just outside the space for the battery 1008 to add strength to the mounts. In one embodiment, cross piece 1010 does not extend the entire distance between nearby mounts, but instead runs a very short distance (about ¼ of that shown), with only one cross piece per mount instead of the three shown. When air cooling is to be used, each of the mounts is over a hole in the substrate to allow air from one side of the substrate through the hole in the insert, and through the mount 1018 to cool the batteries. Air may be removed from in between the batteries or exhausted through the opposite substrate as described below.

FIG. 10B shows a step in the process of building the mounts 1018, which are injection molded to the insert 1016. Referring now to FIG. 10B, bit 1020 is drilled into the insert 1016 just under the point where the injection-molded mount 1018 will contact the battery, although in one embodiment, the shape that would result from such drilling, or another shape that serves the same purposes, is in fact molded into the mounts 1018, and no drilling occurs. FIG. 10C shows the holes from the underside of the insert 1016 when the main hole for the mount 1018 has three holes, including hole 1014 (also shown from the opposite side in FIG. 10A) drilled at its edge. The holes such as hole 1014 in FIG. 10C drilled by bit 1020 of FIG. 10B allow the mount 1018 to deform when the battery is inserted between the mounts, to prevent the deformity of the mount 1018 that would otherwise occur from deforming the insert and the substrate so as to allow them to maintain their substantially flat shape, and help the mounts 1018 hold battery 1008.

FIG. 10D is a side view of battery 1008 inserted into the mounts 1018. Cross piece 1010 is also shown. In one embodiment each battery connection hole 1022 is more clearly shown in FIG. 10D. In one embodiment, there is one key 1022 under each battery, though other embodiments may employ fewer or more keys. Each key is a single, hollow tube extending downward from insert 1016. The hole in the substrate is similar to hole 230 of FIG. 2, but no mount exists in the substrate. Each key 1022 fits into a different hole in the substrate. Each hole in the substrate is nearly the same diameter as the outer diameter of key 1022, with the key extending from the bottom of the insert 1016 with a length substantially as long as the substrate is thick. Into the portion of the insert 1016 above key 1022 is a hole, either molded or drilled therein to allow connection to the battery terminals as described above in a manner similar to hole 344 of FIG. 3. The key holds the insert 1016 in place against the substrate, and prevents the potting compound, or other heat conductive material described above, from flowing under the battery terminals, which could otherwise prevent a good electrical connection between the battery and the bracket.

As noted herein, the mounts 1018 are positioned above holes 1024 in the substrate and optionally, the conductors to allow air to flow through, if air cooling is to be used. The insert 1016 is mated to a hole 1026 in substrate 1006 and electrical connection is made with the brackets via hole 1026 and the hole in the key 1022. The hole in the key opposite the positive terminal of any battery 1008 has a diameter not larger than the positive terminal of the battery 1008 to ensure that the conductor below the substrate 1006 contacting the positive terminal of the battery does not short to the negative case of the battery 1008 if it is pushed towards it.

Referring now to FIG. 10E, two battery assemblies are shown with air handling equipment. In the assembly 1060 on the left, an 1050, 1058 or both draw air from duct 1052, flowing through cowell 1054 through a single assembly 1060 of batteries with air holes as described above and out duct 1056 in the direction indicated by the arrow. In another embodiment, shown with the assembly 1061 on the right, duct 1056 is not used, and fan 1059 draws air through the top of assembly 1061. In another embodiment, shown in FIG. 10F, air flows in the direction indicated by the arrow (or in the opposite direction) through multiple assemblies 1074 having air holes as described above via fan 1070 and cowell 1072. Any space between assemblies 1074 may be covered by ducting.

In one embodiment, the conductors are not adjacent to the substrate, and so a large number of smaller holes may be provided in the conductors to allow air to flow through the conductors generally, but the holes need not be positioned adjacent to a mount in the insert. In such embodiment, the density of holes may be greater around the periphery of the conductor than it is at the center, so as not to interfere with the current carrying capacity of the conductors at locations of high current.

Although the geometries described herein may be used in one embodiment, other embodiments may employ other geometries. For example, in a non-air cooled environment, the mounts need not foe mounted over holes in the substrate.

An Example, and a Method

Figure 12A:
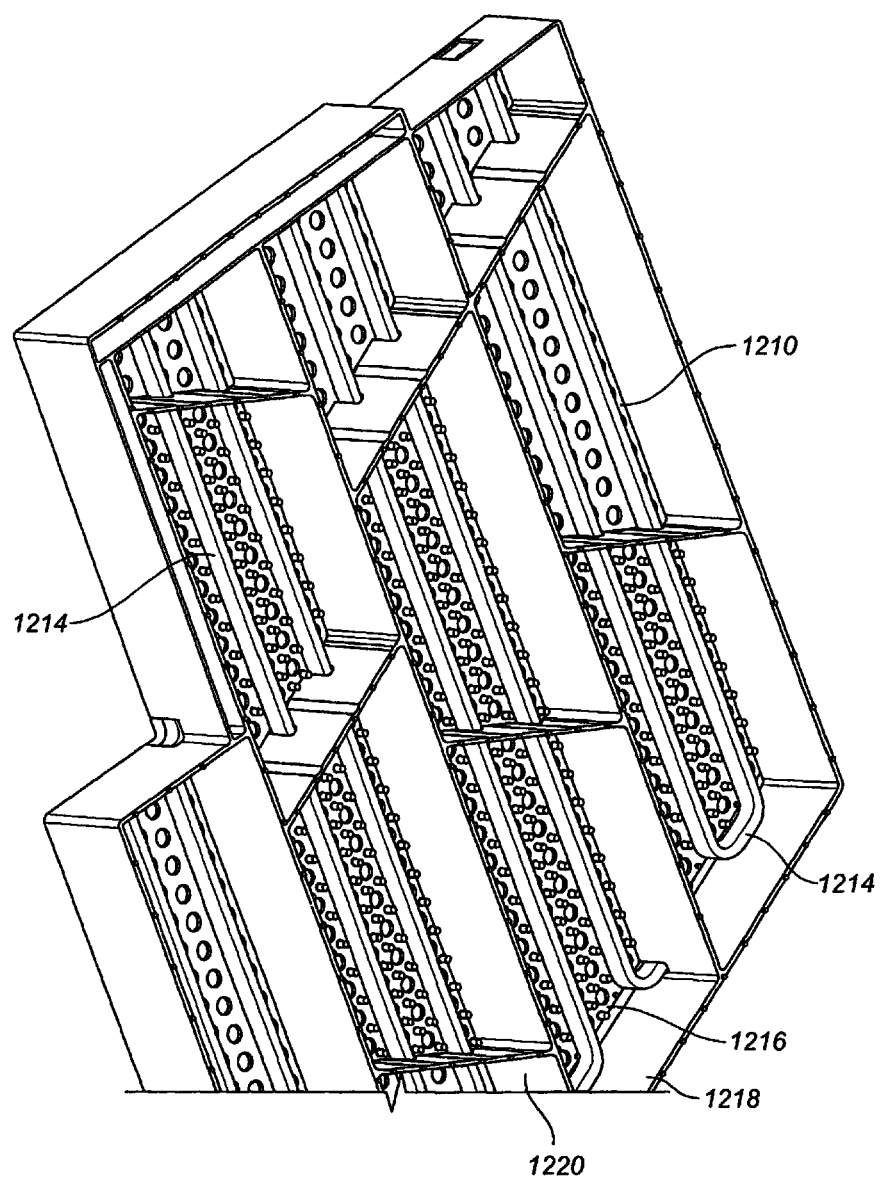
FIG. 12A is a diagram of a substrate, inserts, a cooling tube assembly and walls according to one embodiment of the present invention.

Part of an example assembly according to the present invention is shown in FIG. 12A according to one embodiment of the present invention. FIG. 13 describes the method of assembly.

Referring now to FIGS. 12 and 13, a substrate 1210 is shown with multiple inserts 1216 mated thereto via keys in the inserts 1216 fitting holes in the substrate 1210, corresponding to step 1310. A tubing assembly 1214 is fashioned into shape, for example by bending 1312, and placed 1314 over the inserts 1216.

In step 1316, perimeter walls 1218 are mounted or bonded to the substrate 1210, and divider walls 1220 are inserted between the perimeter walls and may be mounted or bonded to the substrate 1210.

Batteries, not shown, are added 1318 to the mounts in the inserts as described above and potting compound or other thermally conductive material may be added to touch each of the batteries and the adjacent section of the tube, and then in step 1320, a mirror image set of inserts, not shown, are in step 1322, are mounted to a mirror image substrate, not shown, and mounted to the batteries via mounts and to walls 1216, 1218 as described above.

Figure 12B:
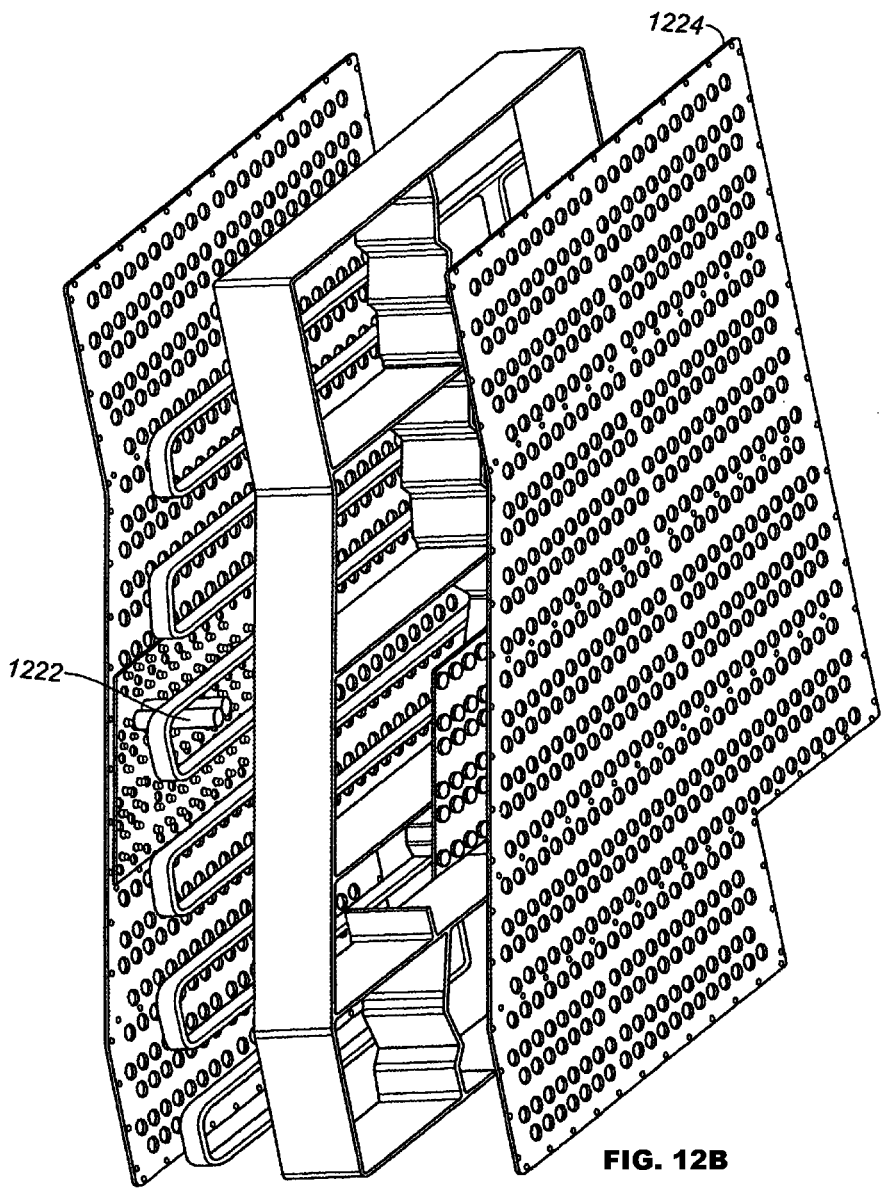
FIG. 12B is an exploded view of a battery assembly, partially filled with two of the dozens of batteries it may contain according to one embodiment of the present invention.

Brackets are connected to conductors 1324 and then connected to the batteries 1326 as described above, offsetting over two sets of batteries, each set having an opposite polarity, to connect the two sets in series, for example. An assembly showing an alternate design, including some of the batteries 1222 and the mirror image substrate 1224 is shown in an exploded view in FIG. 12B. Because FIGS. 12A and 12B are water cooled, the air holes in the substrate near the mounts are not employed.

If there are additional assemblies 1328, they are built as described in steps 1310-1326 and then connectors may be connected 1330 between the edge connectors of adjacent assemblies as described above.

The steps of FIG. 13 may be performed in different order than what is described, or may be interlaced with one another, mounting the batteries and the walls a few at a time, for example.

Other Methods

Figure 14:
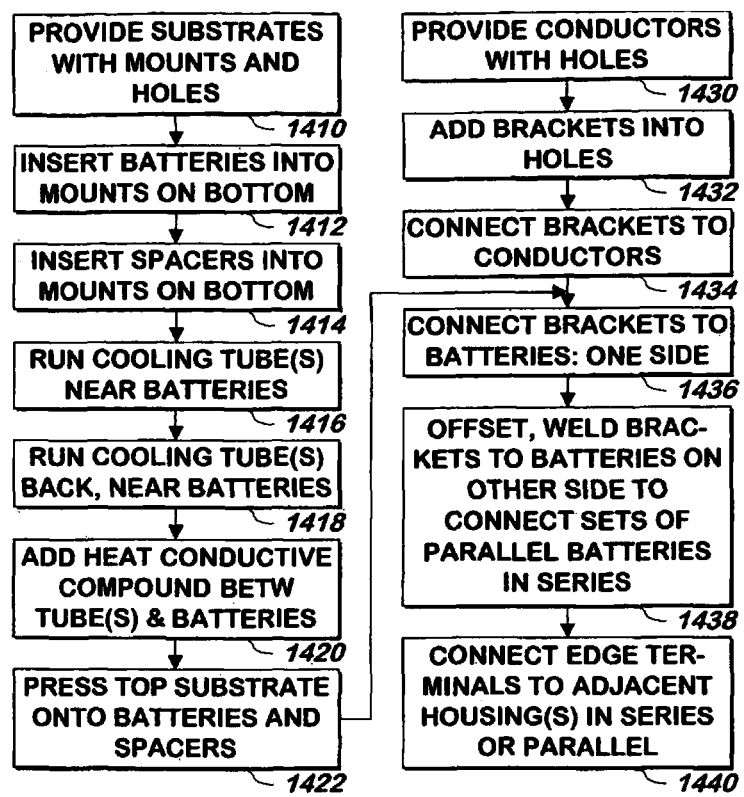
FIG. 14 is a flowchart illustrating a method of mounting batteries in a battery assembly according to one embodiment of the present invention.

Referring now to FIG. 14, a method of mounting and electrically connecting batteries is shown according to one embodiment of the present invention. One or two or more substrates with mounts for each battery and holes for electrical connection to the batteries are provided 1410. In one embodiment, the mounts are molded into the substrate. In another embodiment, the mounts are milled into the substrate, as described above, and will now be described with reference to FIG. 15.

Referring momentarily to FIG. 15, a method of milling battery mounts into a substrate is shown according to one embodiment of the present invention. A first position is selected 1510 and a spinning bit is drilled 1512 part way into the substrate at the first position. A petal is milled 1514 by radiating the drill bit outward from the center of the first position, for example, along a line. The bit is brought back to the center of the first position, and another petal is milled 1516 outward from the center of the first position along any line different from (though potentially 180 degrees from) a line used to mill any other petal for that mount. If there are more petals to mill 1518, the method continues at step 1516 and if not 1518, if there are more positions on the substrate in which a mount is desirable or required 1520, the next position is selected 1526 and the method continues at step 1512 as described above, and otherwise 1520, holes may be drilled through the substrate into the center of some or all of the mounts 1522 to provide electrical access and the method terminates 1524. As noted, batteries may be inserted into the mounts as described below, and the holes drilled in step 1522 may be smaller than the diameter of the positive terminal of the battery to be inserted, so as to protect it from coming into contact with a conductor that may be pushed against it.

Referring again to FIG. 14, multiple batteries are inserted 1412 into the mounts at one substrate, such as the bottom or the top, with one battery per mount in one embodiment. The batteries are inserted as part of sets: the batteries in each set may be inserted with the same polarity of the battery inserted into the mount, but each set may be inserted with polarities inserted that are different from the one or two sets that will be electrically adjacent to it. Spacers may be inserted 1414 into mounts which may or may not be different from the mounts used for the batteries (e.g. the mounts used for the spacers may be narrower than the mounts used for the batteries). In the flowchart, step 1414 follows step 1412, but the two steps may be performed together, with some batteries being inserted and then one or more spacers, then more batteries and done or more additional spacers, etc. Other steps in the flowchart of FIG. 14 or 15 may be performed in this intertwined fashion with other steps or some steps may be performed in a different order than is shown.

One or more cooling tubes may be run 1416 among a path adjacent to some or all of the batteries and the same one or more cooling tubes or a different one or more cooling tubes may be run 1418 back in the opposite direction along the same path or an opposite path. Steps 1416 and 1418 may be combined by running a single cooling tube assembly near each battery. In this manner, each battery is adjacent to two flows, with one in either direction, although other numbers of one or more flows in any number of directions near each battery may also be used. A heat conductive material may be added 1420 to contact the tube or tubes and some or all of the batteries.

Another one or more substrates may be pressed 1422 on to the other end of the batteries that were inserted in step 1412 and the spacers inserted in step 1414 using a conventional press. The other one or more substrates are made with the mounts described above. The mounts may be differently sized depending on the polarity of the battery the mount will accept, or the same sized mount may be used for all polarities. The other one or more substrates of step 1422 may be mirror images of the one or more substrates of step 1414.

Multiple conductors with holes are provided 1430 as described above. Brackets may be inserted 1432 into the holes and each bracket may be electrically connected 1434 to a conductor, such as by wave soldering the brackets to the connector when most or all of the brackets are in the holes of the connector.

The brackets with the connectors and the batteries mounted in the substrates described above are brought together in steps 1436 and 1438, which may be performed essentially simultaneously, but will be described separately for ease and clarity of description. One or more brackets electrically attached to the conductors are electrically attached 1436 to one or two sets of batteries via the holes in the substrates. This may be performed by aligning the brackets protruding out of the holes in each of the one or more conductors, with the holes that expose the terminals of the batteries mounted in one or more substrates.

The alignment may cause each conductor to electrically connect one terminal of each battery in a set to the same polarity terminal of all of the other batteries in a set, and optionally to also connect to such terminals the terminals having the opposite polarity of all of the batteries in a different set. For example, if all of the batteries mounted in the substrate are to be divided into sets, and all of the sets are to be connected in series, there will be one conductor spanning one end of each two electrically adjacent pair of sets, with the ends of each set spanned by a single conductor having opposite polarities, and two additional conductors, each spanning one polarity of all of the batteries in one of the two "end" sets.

Thus, in one embodiment, all but one or two of the conductors are each aligned over the terminals of two complete sets of batteries, the batteries in each set being connected at the same polarity with the other batteries in the set by the brackets and conductors when placed in contact thereto. Two sets of batteries may be connected to the same conductor, with each of the two sets having opposite polarities being connected to the conductor. In one embodiment, the electrical attachment also includes a physical attachment, such as by spot welding, pressure contacting or low-temperature soldering each bracket to one terminal of one of the batteries. In one embodiment, each bracket has two or more connections (e.g. spot welds) to at least most of each of the battery terminals for redundancy.

A process similar to the process described above is repeated for the one or more substrates on the other side of the batteries 1438, with brackets attached to one or more conductors as described above with respect to steps 1430-1434 aligned to fit into the holes in the substrate of the opposite side of the substrate of step 1436 and the brackets are spot welded to, connected, or otherwise electrical brought into contact with, the terminals inserted into the mounts of that substrate. As noted herein, any conductors spanning two sets of batteries are offset from those of the other substrate so that zero or more conductors can each connect the different polarity terminals in each of two sets of batteries in series, and will, in part, connect the batteries within the set in parallel. It isn't necessary to weld the brackets to the batteries: any electrical connection between the bracket and battery terminal can be used.

The conductors at the ends of each series of sets of batteries may be coupled 1442 to one or more edge terminals and the one or more edge conductors of one pair of substrates that make up a battery assembly may be connected 1440, either physically, electrically or both, to an edge conduction of an adjacent pair of substrates that make up a battery assembly (each assembled as described above), so as to connect at least some of the batteries in each assembly in series or parallel. In one embodiment, step 1444 is performed via a single solid, but slightly flexible unit, which may be constructed without wires.

What is claimed is:

1. An energy storage system comprising:
 a plurality of cells each having a cylinder shape, wherein a cell axis extends between first and second ends of each cell;
 first and second substrates, at least one of which has a plurality of mounts configured to receive the first or second ends of the cells, a center of each mount having a hole through the substrate;
 a plurality of perimeter walls enclosing the cells, the perimeter walls mounted between the first and second substrates;
 a cooling tube comprising an extruded piece extending from an inlet to an outlet and configured to provide circulation of coolant in directions generally transverse to the cell axes, the energy storage system configured so that the plurality of cells are held in place within the energy storage system only by the extruded piece and the first and second substrates, the extruded piece having at least one interior crosspiece that defines multiple tubes therein, the extruded piece bent into a shape so as to comprise multiple sections that each run alongside adjacent rows of the cells, the sections being straight and parallel to each other and separated by turnaround sections where the extruded piece reverses direction and instead runs alongside other adjacent rows of the cells, wherein the sections and one of the turnaround sections form a U-turn; and
 a thermally conductive electrically insulating layer interposed between a surface of the extruded piece and contact surfaces of the plurality of cells.

2. The energy storage system of claim 1, wherein the coolant comprises a liquid.

3. The energy storage system of claim 2, wherein the liquid is a refrigerant, the energy storage system further comprising a compressor that compresses the refrigerant.

4. The energy storage system of claim 3, wherein the compressor provides the compressed refrigerant to a condenser in the energy storage system.

5. The energy storage system of claim 3, wherein the compressor is further configured to provide cooling of air for a passenger compartment.

6. The energy storage system of claim 1, wherein the extruded piece comprises an aluminum extrusion having the multiple tubes defined therein.

7. The energy storage system of claim 1, further comprising one or more sensors configured to sense temperature of the energy storage system, the sensors controlled by a microprocessor.

8. The energy storage system of claim 7, wherein the microprocessor is configured to allocate an amount of the coolant based on the sensor.

9. The energy storage system of claim 1, further comprising a radiator configured to absorb heat generated by the cells.

10. The energy storage system of claim 1, further comprising an evaporator configured to absorb heat generated by the cells.

11. The energy storage system of claim 10, wherein the energy storage system provides the coolant into an accumulator from where it is provided to the evaporator.

12. The energy storage system of claim 11, further comprising a heat exchanger, wherein the evaporator absorbs the heat after the coolant has passed by some or all of the cells.

13. The energy storage system of claim 1, wherein each hole through the substrate has one or more teeth at which the hole is narrower than the respective cell.

14. The energy storage system of claim 13, wherein the teeth are configured to deform when the respective cell is being inserted.

15. The energy storage system of claim 1, wherein each hole through the first or second substrate has one or more petals.

16. The energy storage system of claim 1, wherein each hole through the first or second substrate has one or more fins configured to hold the respective cell.

17. The energy storage system of claim 1, wherein the first and second substrates are identical.

18. The energy storage system of claim 1, further comprising a plate positioned by an outside of the first or second substrate, the plate electrically connected to cell terminals through the holes in the first or second substrate.

19. The energy storage system of claim 18, wherein the plate is a conductive element attached with glue to the first or second substrate.

20. The energy storage system of claim 1, wherein adjacent sets of cells are alternately positioned.

21. The energy storage system of claim 1, wherein the perimeter walls are attached to at least one of the first and second substrate using a fastener molded into the first or second substrate.

22. The energy storage system of claim 1, wherein the extruded piece is made of aluminum.

23. The energy storage system of claim 1, wherein at least one conductive element per cell is attached with glue to the first or second substrates.

* * * * *